(12) United States Patent
Mitchell et al.

(10) Patent No.: US 9,113,234 B2
(45) Date of Patent: Aug. 18, 2015

(54) WIRELESS DEVICE ASSOCIATION SYSTEM

(75) Inventors: Bradley J. Mitchell, Snohomish, WA (US); Henry VanRensselaer Fletcher, III, Everett, WA (US); Kevin S. Callahan, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 751 days.

(21) Appl. No.: 12/844,361

(22) Filed: Jul. 27, 2010

(65) Prior Publication Data

US 2012/0026016 A1    Feb. 2, 2012

(51) Int. Cl.
| | |
|---|---|
| *G08B 21/00* | (2006.01) |
| *G08B 13/14* | (2006.01) |
| *G08B 1/08* | (2006.01) |
| *H04Q 9/00* | (2006.01) |
| *G06Q 10/06* | (2012.01) |
| *G06Q 10/00* | (2012.01) |
| *G06Q 50/04* | (2012.01) |
| *G06Q 50/30* | (2012.01) |

(52) U.S. Cl.
CPC .............. *H04Q 9/00* (2013.01); *G06Q 10/06* (2013.01); *G06Q 10/20* (2013.01); *G06Q 50/04* (2013.01); *G06Q 50/30* (2013.01); *H04Q 2209/25* (2013.01); *H04Q 2209/47* (2013.01); *H04Q 2209/75* (2013.01); *H04Q 2209/886* (2013.01)

(58) Field of Classification Search
CPC ....... H04Q 9/00; G06Q 110/06; G06Q 10/20; G06Q 50/04; G06Q 50/30; G06Q 2209/47; G06Q 2209/886; G06Q 2209/25; G06Q 2209/75; G64D 45/0015; G06K 7/0008

USPC ............ 340/572.1–572.9, 10.1, 945, 539.13, 340/539.26, 540, 539.1
See application file for complete search history.

(56) References Cited

U.S. PATENT DOCUMENTS

| | | |
|---|---|---|
| 4,581,606 A | 4/1986 | Mallory |
| 6,008,727 A | 12/1999 | Want et al. |
| 6,591,296 B1 | 7/2003 | Ghanime |
| 6,710,719 B1 | 3/2004 | Jones et al. |
| 6,744,381 B1 * | 6/2004 | Collins ......................... 340/945 |
| 6,822,582 B2 | 11/2004 | Voeller et al. |
| 7,019,640 B2 | 3/2006 | Canich et al. |
| 7,030,760 B1 * | 4/2006 | Brown ....................... 340/568.1 |
| 7,398,932 B2 * | 7/2008 | Ashili et al. .................. 235/492 |
| 7,532,120 B2 * | 5/2009 | Estevez et al. ............. 340/572.1 |
| 7,545,274 B2 * | 6/2009 | Coop ......................... 340/572.1 |
| 7,598,868 B2 * | 10/2009 | Lee et al. ................... 340/572.1 |
| 7,626,505 B2 * | 12/2009 | August et al. .............. 340/572.4 |
| 7,683,773 B1 * | 3/2010 | Goodall et al. ............... 340/505 |
| 7,880,616 B2 * | 2/2011 | Kanagala et al. .......... 340/572.1 |
| 8,190,304 B2 * | 5/2012 | Feuillebois et al. .............. 701/3 |

(Continued)

OTHER PUBLICATIONS

U.S. Appl. No. 12/844,309, filed Jul. 27, 2010, Mitchell et al.

(Continued)

*Primary Examiner* — Hoi Lau
(74) *Attorney, Agent, or Firm* — Yee & Associates, P.C.

(57) ABSTRACT

A method, apparatus, and computer program product for identifying sensor units. Identification information is received from a marker in a wireless signal generated by the marker at a wireless device. The marker is associated with an object. The identification information is sent from the wireless device to a computer system. The computer system associates the wireless device with the object using the identification information.

12 Claims, 7 Drawing Sheets

(56) References Cited

U.S. PATENT DOCUMENTS

| | | | |
|---|---|---|---|
| 8,373,579 B2* | 2/2013 | Naimer et al. | 340/945 |
| 8,378,852 B2* | 2/2013 | Naimer et al. | 340/945 |
| 2002/0057192 A1* | 5/2002 | Eagleson et al. | 340/305 |
| 2003/0080860 A1 | 5/2003 | Stewart et al. | |
| 2003/0097302 A1* | 5/2003 | Overhultz et al. | 705/14 |
| 2004/0233055 A1 | 11/2004 | Canich et al. | |
| 2004/0246900 A1 | 12/2004 | Zhang et al. | |
| 2005/0110674 A1* | 5/2005 | Mendolia et al. | 342/81 |
| 2005/0253722 A1* | 11/2005 | Droms et al. | 340/572.1 |
| 2006/0044112 A1* | 3/2006 | Bridgelall | 340/10.1 |
| 2006/0071790 A1* | 4/2006 | Duron et al. | 340/572.1 |
| 2006/0220857 A1* | 10/2006 | August et al. | 340/572.1 |
| 2007/0001809 A1* | 1/2007 | Kodukula et al. | 340/10.1 |
| 2007/0063847 A1* | 3/2007 | Lee et al. | 340/572.1 |
| 2007/0109100 A1* | 5/2007 | Jett et al. | 340/10.4 |
| 2007/0114280 A1* | 5/2007 | Coop et al. | 235/385 |
| 2007/0152815 A1 | 7/2007 | Meyers et al. | |
| 2007/0200712 A1* | 8/2007 | Arneson et al. | 340/572.8 |
| 2007/0239862 A1 | 10/2007 | Bronez et al. | |
| 2007/0241908 A1 | 10/2007 | Coop | |
| 2008/0001718 A1* | 1/2008 | Karabinis | 340/10.3 |
| 2008/0129037 A1* | 6/2008 | Roth et al. | 283/85 |
| 2008/0150747 A1* | 6/2008 | Eren et al. | 340/825.22 |
| 2008/0157972 A1* | 7/2008 | Duron et al. | 340/572.1 |
| 2008/0238621 A1* | 10/2008 | Rofougaran et al. | 340/10.1 |
| 2008/0238630 A1* | 10/2008 | Chen et al. | 340/10.5 |
| 2009/0099943 A1* | 4/2009 | Bodin et al. | 705/28 |
| 2009/0234517 A1* | 9/2009 | Feuillebois et al. | 701/3 |
| 2009/0243895 A1* | 10/2009 | Mitchell et al. | 340/971 |
| 2009/0322488 A1* | 12/2009 | Kanagala et al. | 340/10.3 |
| 2009/0322551 A1* | 12/2009 | Kanagala et al. | 340/825.72 |
| 2010/0073197 A1* | 3/2010 | Eagleton et al. | 340/945 |
| 2010/0079237 A1* | 4/2010 | Falk et al. | 340/5.8 |
| 2010/0106624 A1 | 4/2010 | Ashrafzadeh et al. | |
| 2010/0141402 A1* | 6/2010 | Eun et al. | 340/10.41 |
| 2010/0164723 A1* | 7/2010 | Shiau et al. | 340/572.1 |
| 2010/0214078 A1* | 8/2010 | Chen et al. | 340/10.5 |
| 2010/0237994 A1* | 9/2010 | Carraher et al. | 340/10.1 |
| 2011/0018686 A1* | 1/2011 | Fahley et al. | 340/10.1 |
| 2011/0133891 A1* | 6/2011 | Krug et al. | 340/10.1 |
| 2011/0248852 A1* | 10/2011 | Falk et al. | 340/572.1 |
| 2012/0019399 A1* | 1/2012 | Vargo et al. | 340/870.11 |
| 2012/0026016 A1* | 2/2012 | Mitchell et al. | 340/945 |
| 2012/0044092 A1* | 2/2012 | Shore et al. | 340/945 |
| 2012/0194322 A1* | 8/2012 | Batra | 340/10.33 |

OTHER PUBLICATIONS

PCT search report dated Dec. 2, 2011 regarding application PCT/US2011/041908, filing date Jun. 24, 2011, applicant The Boeing Company, 9 Pages.

Related U.S. Appl. No. 12/844,309, filed Jul. 27, 2010, inventor Mitchell et al., 48 Pages.

Office Action, dated Apr. 16, 2013, regarding U.S. Appl. No. 12/844,309, 29 pages.

Final Office Action, dated Sep. 11, 2013, regarding U.S. Appl. No. 12/844,309, 11 pages.

Office Action, dated Jul. 17, 2014, regarding U.S. Appl. No. 12/844,309, 11 pages.

Notice of Allowance, dated Oct. 7, 2014, regarding U.S. Appl. No. 12/844,309, 9 pages.

* cited by examiner

WIRELESS DEVICE ASSOCIATION SYSTEM

CROSS-REFERENCE TO RELATED APPLICATION

This application is related to the following patent application: entitled "Sensor Associate System using Wireless Device Information", Ser. No. 12/844,309; filed even date hereof, assigned to the same assignee, and incorporated herein by reference.

BACKGROUND INFORMATION

1. Field

The present disclosure relates generally to aircraft and, in particular, to wireless devices in aircraft. Still more particularly, the present disclosure relates to a method and apparatus for associating wireless functions with objects in an aircraft.

2. Background

Sensor systems are present in most aircraft. A sensor system contains sensors. These sensors are used to monitor various objects for the aircraft. These objects include, for example, without limitation, an in-flight entertainment system, a hydraulic system, landing gear, a tire, an engine inlet, an actuator, an air vent, a portion of a passenger cabin, a fuel tank, and other suitable types of objects.

The sensors transmit data to a data processing system. The data processing system may then analyze the data or route the data to other data processing systems. For example, the data processing system receiving data from the sensors in the sensor system may route the data to a flight management system. In some cases, the data may be transmitted off the aircraft to a ground location or other aircraft.

In many aircraft, the sensors in a sensor system are connected to the data processing system in the sensor system through wires. With these types of sensor systems, each sensor is associated with an object in the aircraft. For example, different objects may be associated with a functional equipment designator. This type of identifier is typically a letter followed by up to six numbers.

These equipment designators are used in wire diagrams, equipment installation diagrams, block diagrams, wired definition databases, maintenance manuals, and other sources of aircraft information. When a sensor is installed or replaced, the wiring diagrams allow for an association of particular sensors with the object. In this manner, a wire from a sensor to a particular port in a data processing system is used to identify the sensor with the particular object.

With a desire to reduce the complexity of aircraft, the weight of aircraft, and the costs, wired sensor systems, in some cases, have been replaced with wireless sensor systems. With these types of sensor systems, a wireless sensor transmits information to a data processing system in the sensor system through a wireless connection. The wireless connection may be direct or use one or more routers.

With these types of sensor systems, an association of a wireless sensor with a port through a wiring diagram cannot be made. As a result, associating a particular wiring sensor with an object in the aircraft may be difficult to perform such that the identification meets various rules and regulations. As a result, the use of wireless sensors in some portion of an aircraft may be unfeasible without an ability to easily identify information from a particular wireless sensor with a particular object.

Therefore, it would be advantageous to have a method and apparatus that takes into account some of the issues discussed above, as well as possibly other issues.

SUMMARY

In one advantageous embodiment, an apparatus comprises a wireless device and a computer system. The wireless device is configured to obtain identification information from a marker and transmit the identification information in a wireless signal. The computer system is configured to receive the wireless signal with the identification information, identify an object assigned with the marker, and associate the wireless device with the marker.

In another advantageous embodiment, a method is provided for identifying wireless devices. Identification information is received from a marker at a wireless device. The marker is associated with an object. The identification information is sent from the wireless device to a computer system. The computer system associates the wireless device with the object using the identification information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
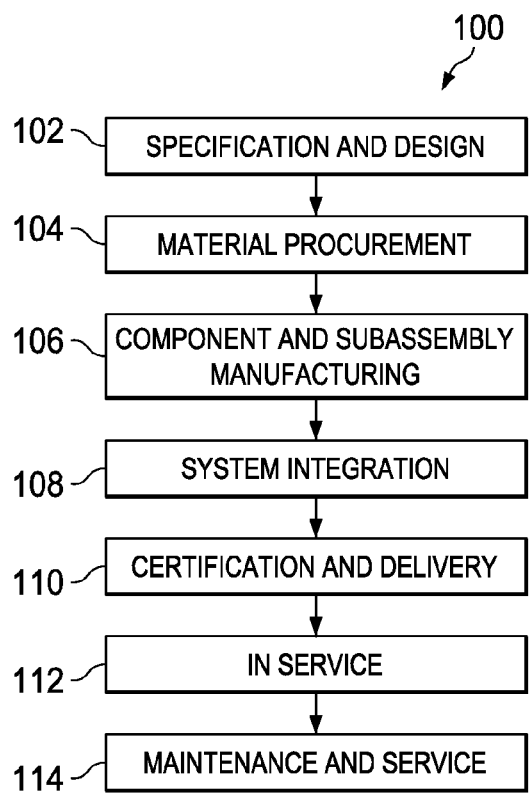
FIG. 1 is an illustration of an aircraft manufacturing and service method in accordance with an advantageous embodiment.
Figure 2:
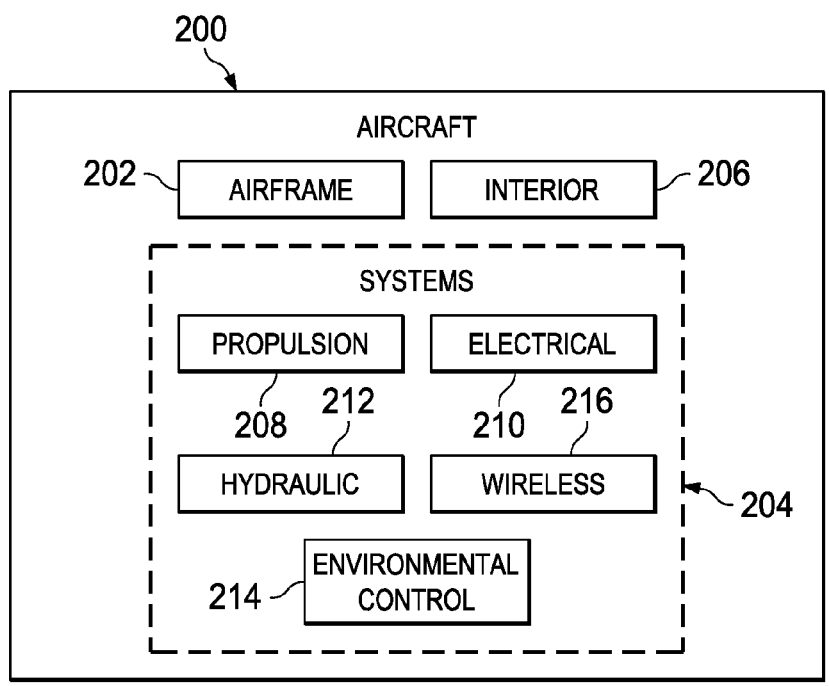
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental control system 214, and wireless system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of, and/or reduce the cost of aircraft 200.

The different advantageous embodiments recognize and take into account a number of different considerations. For example, the different advantageous embodiments recognize and take into account that the use of wireless devices may reduce the weight of aircraft. The wires needed to connect devices to a computer system may be unnecessary. As a result, weight savings from reducing or eliminating the use of wires results in a reduction in weight of the aircraft.

The different advantageous embodiments also recognize and take into account that the installation of wireless devices may also reduce the time and cost needed to manufacture an aircraft. For example, installation of wires and connection of devices to wires are unnecessary with wireless systems.

The different advantageous embodiments recognize and take into account, however, that with wireless devices, wires are not present to make an association between the device and the computer system to which the wireless devices send information. In other words, a wire is not present at a port of the computer system that leads to a particular device. Thus, the different advantageous embodiments recognize and take into account that wiring diagrams are not present for these wireless systems.

Wireless sensors are one example of wireless devices that may be found in an aircraft. The different advantageous embodiments recognize and take into account that, although a wireless sensor may be placed on or near an object identifying data received from a wireless sensor as being for that particular wireless sensor, monitoring the particular object may be difficult.

The different advantageous embodiments recognize and take into account that one solution may involve having an operator or maintenance person write down an identifier of each wireless sensor as the wireless sensor is installed. This identifier may be entered into a database or other collection of data to associate the wireless sensor with the object.

This type of process is prone to errors that may be made in writing down identifiers of sensors and their associated objects. As a result, the different placements of wireless sensors may be checked by another operator. Installing this type of system may be labor intensive. Additionally, maintenance of the sensor systems also may be labor intensive. For example, each time a sensor is replaced, the identifier for the sensor is again written down and entered into a database.

Thus, the different advantageous embodiments provide a method and apparatus for identifying sensor units. Identification information is received from a marker in a wireless signal generated by the marker at a wireless sensor unit in a sensor system. The marker is associated with an object. The identification information of the object associated with the marker is sent from the wireless sensor unit to a computer system in the sensor system. The computer system associates the wireless sensor unit using the object identifier.

Figure 3:
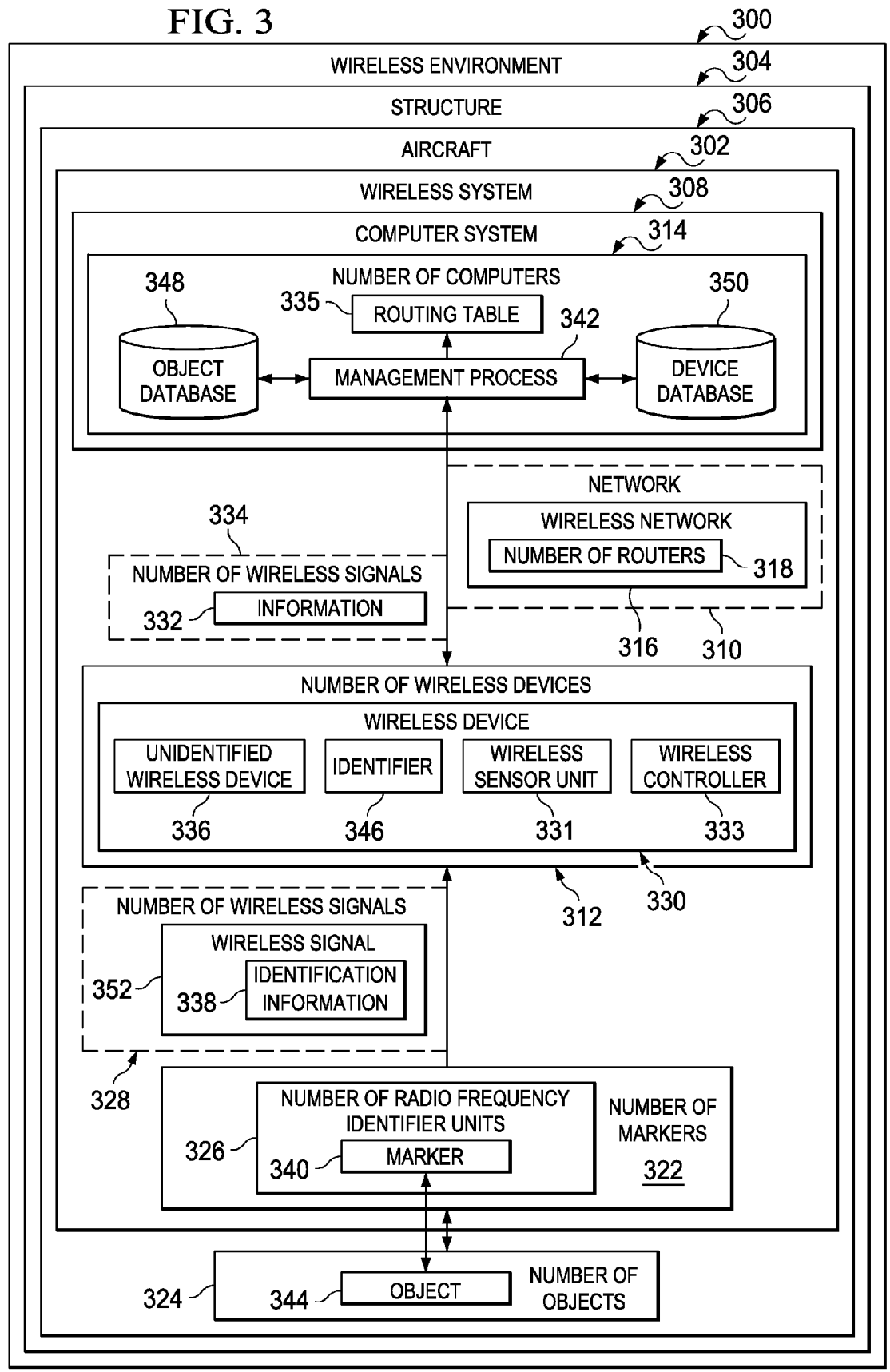
FIG. 3 is an illustration of a wireless communications environment in accordance with an advantageous embodiment.

With reference now to FIG. 3, an illustration of a wireless environment is depicted in accordance with an advantageous embodiment. Wireless environment 300 is an example of an environment that may be implemented in aircraft 200 in FIG. 2.

In this illustrative example, wireless system 302 is present in wireless environment 300. Wireless system 302 is implemented within structure 304. Structure 304 takes the form of aircraft 306 in this example. Aircraft 306 may be, for example, aircraft 200 in FIG. 2. Wireless system 302 is an example of one implementation for wireless system 216 in FIG. 2.

As illustrated, wireless system 302 comprises computer system 308, network 310, and number of wireless devices 312. A wireless device is any device configured to send and/or receive wireless signals. Additionally, a wireless device is configured to operate without the use of wires for communications and/or for power.

In these illustrative examples, computer system 308 comprises number of computers 314. Network 310 takes the form of wireless network 316 in which wireless network 316 contains number of routers 318.

In these illustrative examples, number of markers 322 is associated with number of objects 324 in structure 304. A first component may considered to be associated with a second component by being secured to the second component, bonded to the second component, fastened to the second component, and/or connected to the second component in some other suitable manner. The first component also may be connected to the second component by using a third component. The first component may also be considered to be associated with the second component by being formed as part of and/or an extension of the second component.

Number of markers 322 may include any device configured to generate a wireless signal containing information. For example, without limitation, number of markers 322 may include number of radio frequency identifier units 326. In these illustrative examples, number of markers 322 generates number of wireless signals 328 with a limited range. In other words, a marker within number of markers 322 may generate a signal that does not reach all of structure 304. In some examples, a wireless signal may be detectable only within a few inches or feet from the marker from which the wireless signal is generated.

In these illustrative examples, number of objects 324 may take a number of different forms. Number of objects 324 includes objects located within structure 304. When structure 304 takes the form of aircraft 306, number of objects 324 may include, for example, without limitation, an air vent, an in-flight entertainment system, a landing gear, a tire, an engine inlet, an actuator, a portion of a passenger cabin, a passenger seat, a window, and/or other suitable types of objects. In some illustrative examples, number of objects 324 may include aircraft 306.

In these illustrative examples, wireless device 330 in number of wireless devices 312 sends information 332 to computer system 308 using number of wireless signals 334. In this particular example, wireless device 330 takes the form of unidentified wireless device 336.

As depicted, wireless device 330 may take the form of, for example, wireless sensor unit 331, wireless controller 333, or some other suitable wireless device. Wireless sensor unit 331 may take the form of, for example, without limitation, a temperature sensor, a pressure sensor, a light sensor, an audio sensor, or some other suitable type of sensor unit.

Further, wireless controller 333 may be any device configured to perform a function in structure 304. In particular, wireless controller 333 may be configured to perform a function using object 344. Additionally, wireless controller 333 may be configured to perform the function in response to a number of commands.

For example, wireless controller 333 may take the form of a window-dimming controller. Wireless controller 333 may be associated with a window or group of windows in aircraft 306 and may receive commands to control the amount of dimming for the window or group of windows.

In another illustrative example, wireless controller 333 may be a controller configured to operate the volume in an in-flight entertainment system. Wireless controller 333 may be part of an environmental control system. Wireless controller 323 may be associated with an air vent that is movable to control airflow associated with an air vent. For example, wireless controller 333 may be used to control the flow of air through the vent in the environmental control system.

In the illustrative examples, Wireless device 330 is located near number of markers 322. Wireless device 330 is configured to obtain identification information 338 from marker 340 in number of markers 322. Wireless device 330 sends identification information 338 as part of information 332 in number of wireless signals 334 to computer system 308.

In this illustrative example, management process 342 runs on computer system 308. Management process 342 uses identification information 338 to identify object 344 associated with marker 340 in number of objects 324. Management process 342 associates wireless device 330 with object 344.

This association may be made using identifier 346 for wireless device 330. Identifier 346 may be, for example, without limitation, a media access control address, a serial number, a part number, and/or some other suitable type of identifier that can be used to identify wireless device 330. In these examples, wireless device 330 sends identifier 346 to computer system 308 when sending information 332.

Additionally, management process 342 may identify object 344 as being associated with marker 340 using object database 348. Object database 348 contains associations of markers with objects. After object 344 is identified for wireless device 330, wireless device 330 may be associated with object 344 in device database 350.

The associations in device database 350 may be used to create routing table 335. Routing table 335 identifies devices to which information is sent for processing. For example, sensor data received from wireless sensor unit 331 may be sent to a device selected using routing table 335 for processing.

In some illustrative examples, computer system 308 may create routing table 335 for use by number of routers 318 in wireless network 316. Number of routers 318 may use routing table 335 to determine where to send information 332 received from wireless device 330.

Number of routers 318 may also use routing table 335 to determine which wireless device to send a number of commands. For example, when wireless device 330 is wireless controller 333, number of routers 318 may use routing table 335 to determine which commands are to be sent to wireless controller 333. In response to receiving these commands, wireless controller 333 may perform a function using object 344.

In these illustrative examples, wireless device 330 obtains identification information 338 from marker 340 through wireless signal 352 generated by marker 340. Marker 340 generates wireless signal 352 with identification information 338 in any number of different ways. For example, marker 340 may generate wireless signal 352 in response to being interrogated by wireless device 330.

In other words, wireless device 330 may generate a signal that causes marker 340 to respond with wireless signal 352. In other illustrative examples, marker 340 may generate wireless signal 352 periodically, continuously, or in response to some other event. For example, the event may be an operator activating a button on marker 340 or on wireless device 330.

In some cases, additional markers, in addition to marker 340, may be present. When multiple markers are present, wireless device 330 may select the identification information to transmit to computer system 308 as being identification information from the marker having the strongest signal.

In still other illustrative examples, wireless device 330 may perform other types of processing to identify the marker. In some illustrative examples, wireless device 330 may send all of the identification information from all of the markers detected to computer system 308. Management process 342 may then process all of the identification information received for all of the markers to identify the particular object from a plurality of possible objects with which to associate wireless device 330.

For example, multiple wireless devices having the same part number may be distinguished from each other using management process 342. In particular, multiple wireless devices having the same part number may be used in different locations throughout structure 304 for different system functions within structure 304. Management process 342 uses identification information 338 to distinguish these wireless devices from each other.

As another illustrative example, multiple wireless devices having the same part number may be associated with the same object. However, each of these wireless devices may be associated with a different function. These wireless devices associated with the same object may be distinguished using management process 342.

In this manner, wireless devices may be associated with objects without having physical wires connecting the device to a particular port in a computer system. As one illustrative example, this process may be performed to increase the speed at which replacement of sensor units may occur. For example, all of the sensor units in a sensor system may be re-identified during a maintenance operation or testing of the sensor system. In still other advantageous embodiments, a sensor unit may be re-identified after some movement has occurred.

The illustration of wireless environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, wireless system 302 may also include some devices connected to computer system 308 using wires. In still other illustrative examples, structure 304 may take other forms other than aircraft 306. For example, structure 304 may be a spacecraft, a tank, a submarine, a surface ship, a train, an office building, a manufacturing facility, a bridge, and other suitable types of structures in which sensor systems may be employed.

Figure 4:
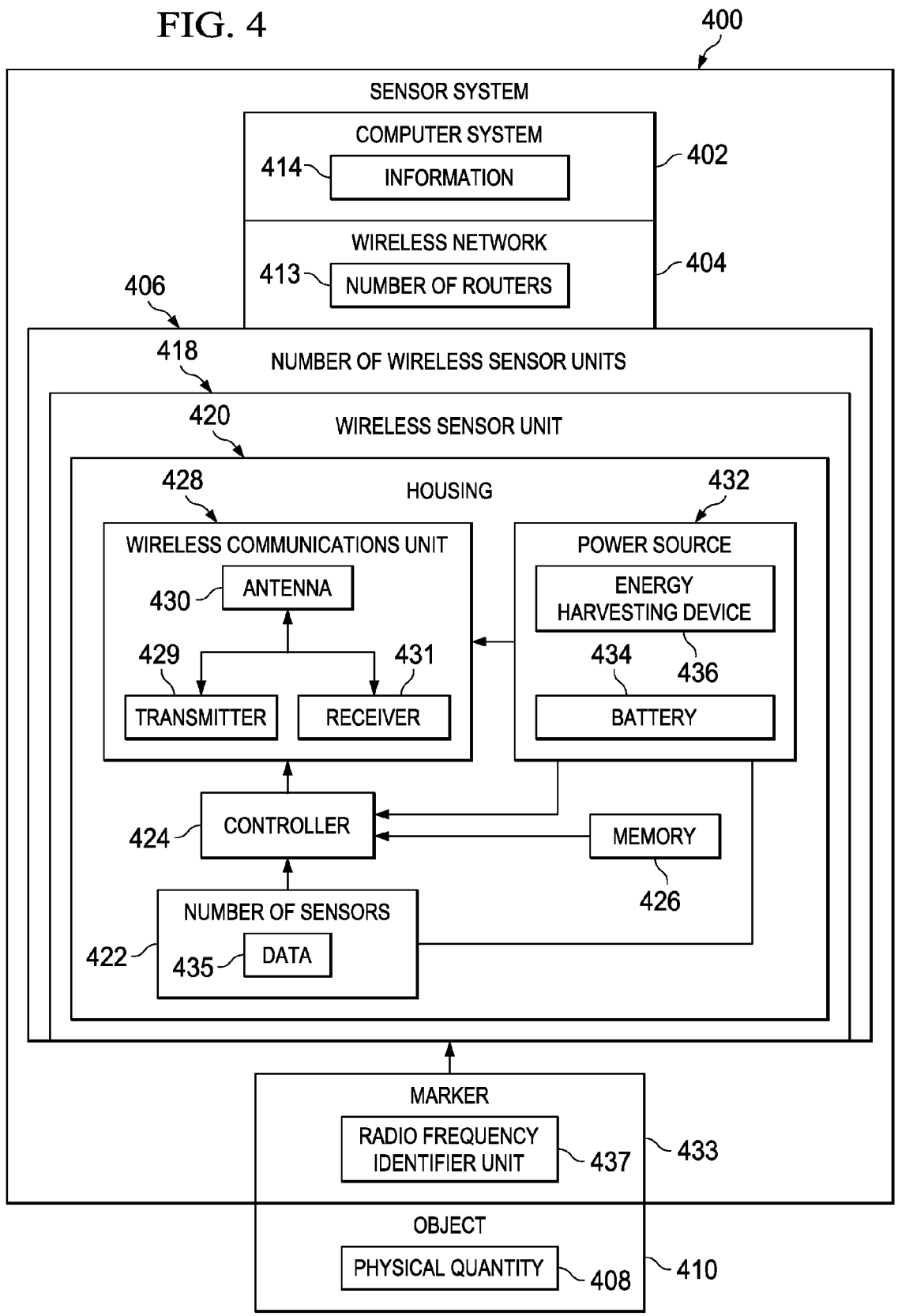
FIG. 4 is an illustration of a sensor system in accordance with an advantageous embodiment.

With reference now to FIG. 4, an illustration of a sensor system is depicted in accordance with an advantageous embodiment. In this illustrative example, sensor system 400 is an example of one implementation for wireless system 302 in FIG. 3.

As depicted, sensor system 400 includes computer system 402, wireless network 404, and number of wireless sensor units 406. Number of wireless sensor units 406 is an example of one implementation for number of wireless devices 312 in FIG. 3. Number of wireless sensor units 406 detects physical quantity 408 in object 410.

In these examples, computer system 402 may include any device that is capable of receiving and storing information 414. Information 414 is received from number of wireless sensor units 406 measuring physical quantity 408 of object 410. Computer system 402 may take the form of a number of computers, a controller, and/or other suitable devices.

In these examples, computer system 402 is associated with number of wireless sensor units 406 through wireless network 404. Wireless network 404 includes number of routers 413.

As depicted in this example, number of wireless sensor units 406 includes wireless sensor unit 418. In this illustrative example, wireless sensor unit 418 includes housing 420, which contains number of sensors 422, controller 424, memory 426, wireless communications unit 428, and power source 432.

Data 435 is generated by number of sensors 422. In this illustrative example, controller 424 may temporarily store data 435 in memory 426 until data 435 is transmitted by wireless communications unit 428 to computer system 402. In particular, transmitter 429 in wireless communications unit 428 sends data 435 over antenna 430 to number of routers 413 in wireless network 404. In this manner, number of routers 413 sends data 435 to computer system 402 to be stored as information 414.

In these examples, transmitter 429 transmits wireless signals over antenna 430 in the form of radio frequency signals. Further, in some illustrative examples, transmitter 429 also may be associated with a unique identification number that is included with a transmitted data packet to distinguish between different sensors and/or identify sensor locations.

Controller 424 controls the sampling or receipt of data 435 from number of sensors 422. Controller 424 may be configured to obtain and transmit data 435 from number of sensors 422 based on an event.

These events may be periodic or non-periodic. For example, in an aircraft, the periodic event may be a schedule in which cabin air temperature is sensed every 10 seconds. In other advantageous embodiments, data 435 may be sensed by an external event, such as the physical opening of a door.

Further, wireless sensor unit 418 also may send data 435 based on these events and send data at least periodically to indicate that the sensor is still functioning.

Number of sensors 422 may include sensors of various forms. For example, without limitation, number of sensors 422 may include at least one of a thermometer, a thermistor, an ohm meter, an ammeter, a volt meter, a Hall effect device, an altimeter, a pressure sensor, a gas flow sensor, an oxygen sensor, a carbon monoxide sensor, a photocell, an infrared sensor, a microphone, a hydrophone, a motion sensor, and other suitable types of sensors.

In these illustrative examples, wireless communications unit 428 also includes receiver 431. Receiver 431 is configured to receive wireless signals over antenna 430 from marker 433 associated with object 410. Marker 433 takes the form of radio frequency identifier unit 437 in this depicted example. More specifically, marker 433 is a radio frequency identification tag.

Marker 433 is configured to send identification information for marker 433 to wireless sensor unit 418 in a wireless signal generated by marker 433. In this illustrative example, the wireless signal generated by marker 433 is a radio frequency signal. The identification information in the wireless signal is received by wireless sensor unit 418 using wireless communications unit 428. This identification information is stored in memory 426 and is transmitted when data 435 is sent to computer system 402.

In these depicted examples, power source 432 provides power to transmitter 428, controller 424, memory 426, and number of sensors 422 for the various operations that are needed. In some illustrative examples, power source 432 may be connected only to selected components, while other components may be provided power through connections to the power components.

Power source 432 may be, for example, battery 434 and/or energy harvesting device 436. Energy harvesting device 436 may be, for example, a photovoltaic device that generates electrical power when exposed to a light source, such as sunlight or cabin lighting. In other embodiments, energy harvesting device 436 may be, for example, a vibration harvesting device. This type of device may be, for example, a cantilevered piezoelectric beam unit. This type of device generates electrical power when exposed to aircraft or operational vibration.

Another non-limiting example of an implementation for energy harvesting device 436 is a thermoelectric device. This type of device generates electrical power when exposed to a thermal gradient. This thermal gradient may be, for example, a hot hydraulic line in ambient air or a thermal gradient across an aircraft insulation blanket.

Energy harvesting device 436 may provide power when various conditions are present. The collusion of battery 434 may provide power to wireless sensor unit 418 if other conditions are not present to allow energy harvesting device 436 to generate power. Further, energy harvesting device 436 also may charge battery 434.

In some applications, a capacitor or a super-capacitor may be used in lieu of battery 434 to provide power to the various components. This capacitor or super-capacitor may be used in collusion with energy harvesting device 436.

In this manner, wireless sensor unit 418 may not require any wiring in the aircraft. Further, no aircraft power or data wiring is required for the normal operation of these devices. As a result, power requirements and weight from wiring sensors are not incurred. This type of wireless sensor also makes it easy to change the locations of sensors when the aircraft is reconfigured. Further, the use of this type of sensor makes it easy to add sensor networks to already existing aircraft.

In these illustrative examples, the wireless sensors are configured in a star network topology in which the different wireless sensors send data to a central node, such as one of number of routers 413. The routers are configured in a wireless mesh network configuration. This configuration provides at least two pathways of communication to each node and may send information back and forth. Further, routes are created between nodes only as needed to transmit information. Of course, in other advantageous embodiments, the wireless sensor units and the routers may be configured in some other suitable manner.

The illustration of sensor system 400 in FIG. 4 is not meant to imply architectural limitations to the manner in which sensor system 400 may be implemented. For example, in some advantageous embodiments, more than one object 410 may be associated with wireless sensor unit 418. As another example, in some advantageous embodiments, wireless sensor unit 418 may not include memory 426.

Additionally, in some illustrative examples, a portion of number of wireless sensor units 406 may be configured to send data 435 directly to computer system 402 without using number of routers 413.

Figure 5:
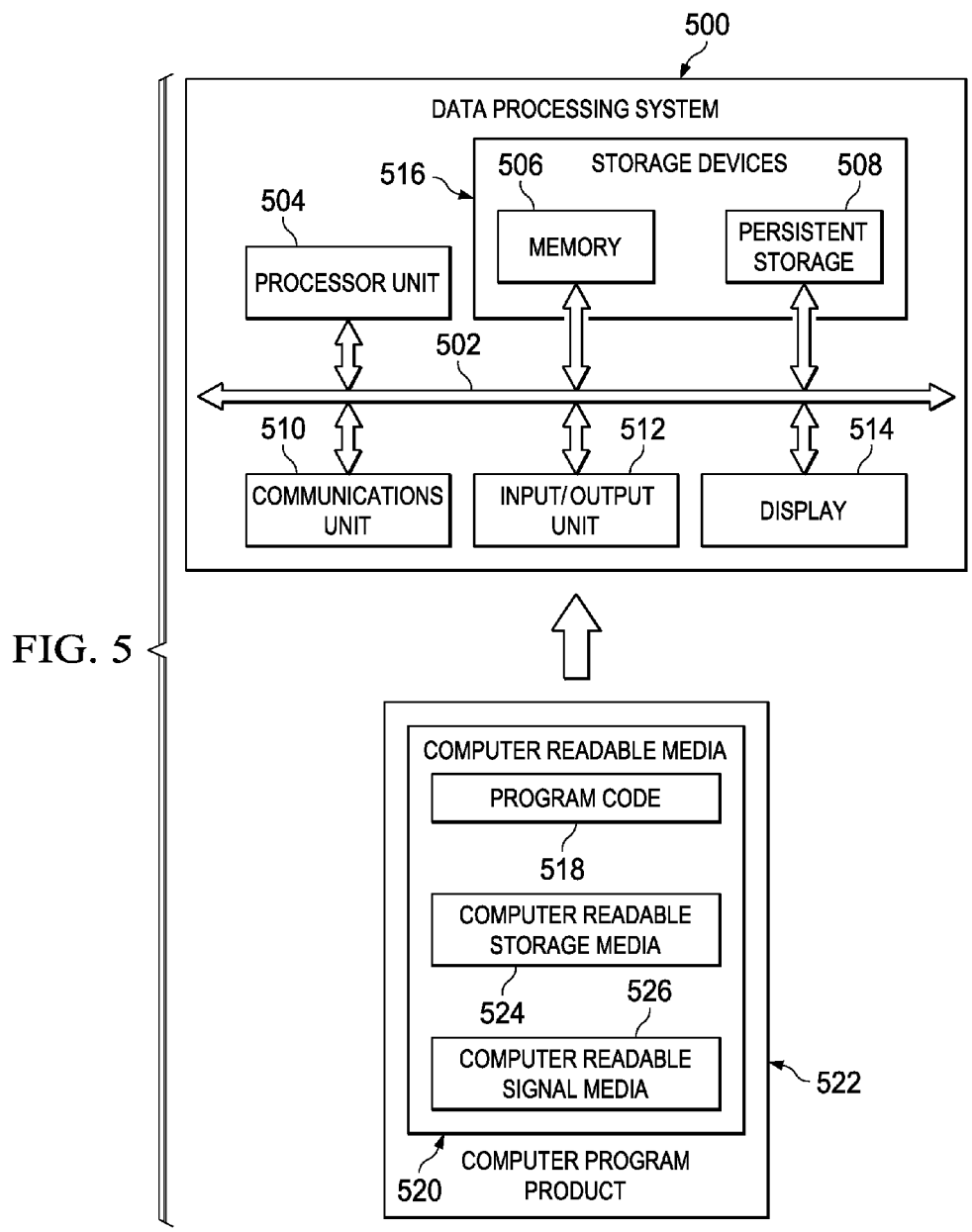
FIG. 5 is an illustration of a data processing system in accordance with an advantageous embodiment.

Turning now to FIG. 5, an illustration of a data processing system is depicted in accordance with an advantageous embodiment. In this illustrative example, data processing system 500 is an example of one implementation for a computer in computer system 308 in FIG. 3 and/or computer system 402 in FIG. 2.

Data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

Figure 6:
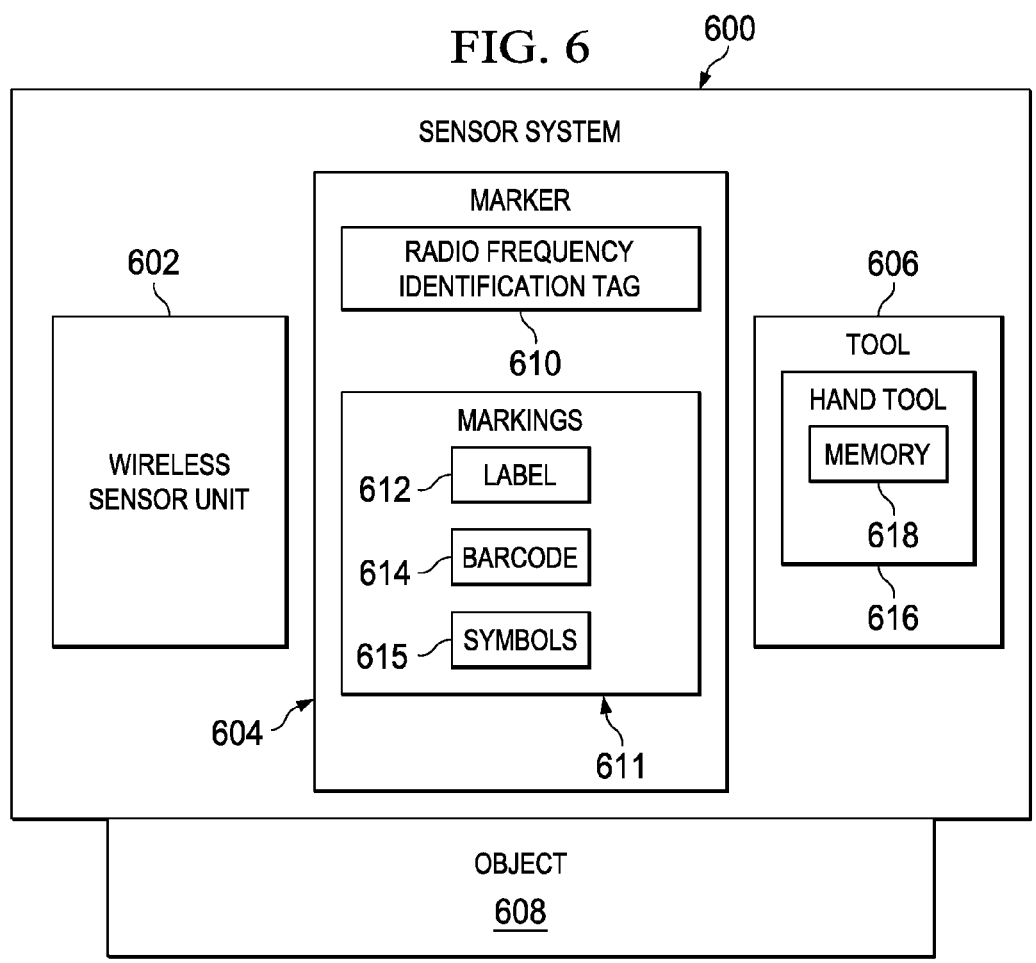
FIG. 6 is an illustration of a sensor system in which a tool is used to associate a wireless sensor unit with an object in accordance with an advantageous embodiment.

With reference now to FIG. 6, an illustration of a sensor system in which a tool is used to associate a wireless sensor unit with an object is depicted in accordance with an advantageous embodiment. Sensor system 600 is an example of one implementation for wireless system 216 in FIG. 2 and/or wireless system 302 in FIG. 3. In this illustrative example, sensor system 600 includes wireless sensor unit 602, marker 604, and tool 606. Wireless sensor unit 602 is an example of one implementation for wireless device 330 in FIG. 3.

Wireless sensor unit 602 may be implemented using wireless sensor unit 418 in FIG. 4, for example, without limitation. Wireless sensor unit 602 is located near marker 604 in this illustrative example. Marker 604 is associated with object 608. For example, marker 604 may be attached to, placed on, glued to, stuck to, and/or otherwise associated with object 608.

In this illustrative example, marker 604 takes the form of any marker from which information can be obtained by tool 606. For example, marker 604 takes the form of radio frequency identification tag 610. Radio frequency identification tag 610 may be an active or passive radio frequency identification tag. Marker 604 provides identification information in the form of markings 611 on marker 604.

Markings 611 may take the form of at least one of, for example, without limitation, label 612, barcode 614, symbols 615, and some other suitable type of identifier. Markings 611 may include, for example, text, numbers, symbols, shapes, patterns, three-dimensional shapes, three-dimensional patterns, and/or other suitable types of markings.

Tool 606 is a hardware device used to obtain the identification information provided by marker 604. For example, tool 606 is hand tool 616 in this illustrative example. Hand tool 616 may be configured to read label 612 using optical character recognition (OCR). In some illustrative examples, hand tool 616 may be configured to read barcode 614. Further, hand tool 616 may be configured to receive a radio frequency signal from marker 604.

In one illustrative example, hand tool 616 sends a signal to marker 604 to request the identification information provided by marker 604. Hand tool 616 then receives the identification information in a response signal from marker 604. Hand tool 616 sends this identification information to wireless sensor unit 602.

In these illustrative examples, the identification information received by hand tool 616 may be stored in memory 618 in hand tool 616. The identification information may be uploaded to wireless sensor unit 602 immediately after the identification information is read by hand tool 616 or after some period of time.

In some illustrative examples, hand tool 616 generates a radio frequency signal that is received by marker 604. In response to receiving the radio frequency signal from hand tool 616, marker 604 sends the identification information to wireless sensor unit 602.

Figure 7:
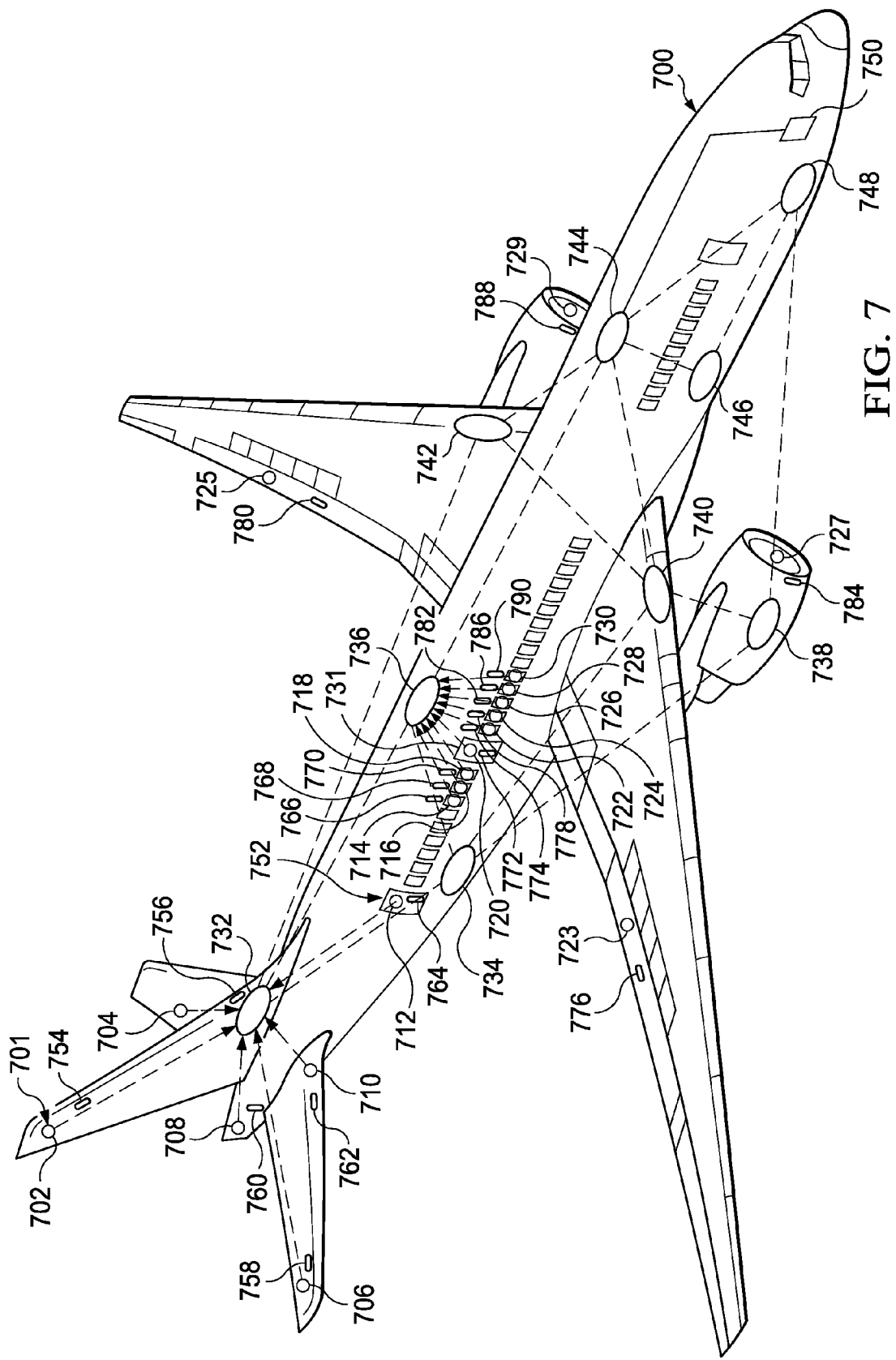
FIG. 7 is an illustration of an exposed perspective view of an aircraft with a sensor system in accordance with an advantageous embodiment.

With reference now to FIG. 7, an illustration of an exposed perspective view of an aircraft with a sensor system is depicted in accordance with an advantageous embodiment. In this illustrative example, aircraft 700 is an example of one implementation for aircraft 200 in FIG. 2 and aircraft 306 in FIG. 3. Aircraft 700 includes sensor system 701, which is an example of one implementation for wireless system 216 in FIG. 2 and wireless system 302 in FIG. 3.

As depicted, sensor system 701 includes wireless sensor units 702, 704, 706, 708, 710, 712, 714, 716, 718, 720, 722, 723, 724, 725, 726, 727, 728, 729, and 730. Sensor system 701 also includes wireless routers 732, 734, 736, 738, 740, 742, 744, 746, and 748.

As can be seen, the different wireless sensor units may be located inside and outside of the aircraft. In these examples, wireless sensor units 702, 704, 706, 708, 710, 712, 723, 725, 727, and 729 are located on the exterior of aircraft 700. Wireless sensor units 714, 716, 718, 720, 722, 724, 726, 728, and 730 are located on the interior of the aircraft. In this illustrative example, wireless sensor units 714, 716, 718, 720, 722, 724, 726, 728, and 730 may be motion sensors configured to detect movement within the passenger cabin of aircraft 700.

As one illustrative example, wireless sensor unit 720 is configured to detect when door 731 is open. As another illustrative example, wireless sensor unit 723 and wireless sensor unit 725 are configured to detect movement of actuators associated with the flaps on the wings of aircraft 700. Wireless sensor unit 727 and wireless sensor unit 729 are configured to detect air pressure within the engine inlets for aircraft 700.

Additionally, the different wireless routers may be located on the interior or exterior of the aircraft, depending on the particular implementation. In these examples, wireless routers 732, 738, 740, 742 and 748 are located on the exterior of aircraft 700. Wireless routers 734, 736, 744, and 746 are located inside the aircraft.

In this illustrative example, interior locations in the aircraft may include, for example, the passenger cabin, cabin ceiling areas, cargo holds, and electrical equipment centers. Exterior locations may include, for example, landing gear wheel wells, engine struts, or within the empennage of aircraft 700.

The wireless sensor units send information to computer system 750 in aircraft 700 using wireless network 752 formed by wireless routers 732, 734, 736, 738, 740, 742, 744, 746, and 748. As depicted, a wireless router in wireless network 752 may receive information from more than one wireless sensor unit. Further, a wireless router may receive information from other wireless routers.

As depicted, sensor system 701 also includes markers 754, 756, 758, 760, 762, 764, 766, 768, 770, 772, 774, 776, 778, 780, 782, 784, 786, 788, and 790. Markers 754, 756, 758, 760, 762, 764, 766, 768, 770, 772, 774, 776, 778, 780, 782, 784, 786, 788, and 790 are located near wireless sensor units 702, 704, 706, 708, 710, 712, 714, 716, 718, 720, 722, 723, 724, 725, 726, 727, 728, 729, and 730, respectively. Further, each of these markers is associated with a different object within aircraft 700. For example, marker 772 is associated with door 731 in this illustrative example.

In this illustrative example, the markers are configured to send identification information to the wireless sensor units. For example, marker 772 sends identification information for marker 772 in a wireless signal to wireless sensor unit 720. Wireless sensor unit 720 sends this identification information to computer system 750. Computer system 750 uses this identification information to associate wireless sensor unit 720 with door 731.

In some illustrative examples, one wireless sensor unit may receive identification information from multiple markers. For example, wireless sensor unit 720 may receive identification information from marker 772, marker 770, and marker 774. In these types of situations, wireless sensor unit 720 selects which identification information to send to computer system 750 based on the signal strengths of the signals received from the markers.

The wireless sensor unit may also select which identification information to send to computer system 750 based on identification information. The identification information may include a sensor type, a key, a tag, or some other suitable information that may be used by wireless sensor unit 720 to associate with a marker.

Markers 754, 756, 758, 760, 762, 764, 766, 768, 770, 772, 774, 776, 778, 780, 782, 784, 786, 788, and 790 may be configured to send identification information to the wireless sensor units continuously, periodically, or in response to some event.

In some illustrative examples, computer system 750 sends a signal through wireless network 752 requesting identification information from the wireless sensor units. In response to receiving such a request, the wireless sensor units then send a signal to the markers requesting the identification information. In response to receiving this signal from the wireless sensor units, the markers send a response signal containing the identification information to the wireless sensor units.

Of course, in other advantageous embodiments, the identification information for the markers may be sent to computer system 750 in some other suitable manner.

Although aircraft 700 has been depicted with wireless sensor units, aircraft 700 may also include wireless controllers. For example, aircraft 700 may include a number of wireless controllers associated with the interior of the windows for aircraft 700. These wireless controllers may be part of a window-dimming system.

Figure 8:
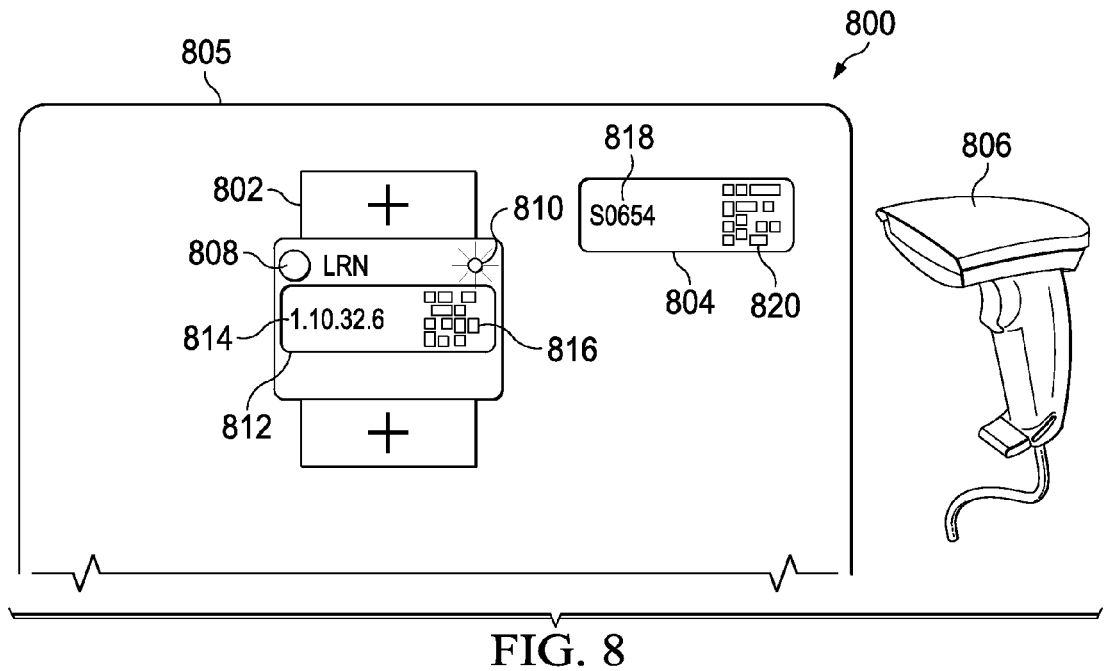
FIG. 8 is an illustration of a sensor system in accordance with an advantageous embodiment.

With reference now to FIG. 8, an illustration of a sensor system is depicted in accordance with an advantageous embodiment. In this illustrative example, sensor system 800 is an example of one implementation for sensor system 600 in FIG. 6. Sensor system 800 includes wireless sensor unit 802, marker 804, and hand tool 806.

As depicted, wireless sensor unit 802 is located on seat 805. Seat 805 is a seat in the passenger cabin of an aircraft in this depicted example. Wireless sensor unit 802 includes button 808, light emitting diode 810, and marker 812. When button 808 on wireless sensor unit 802 is pressed, wireless sensor unit 802 enters a learn mode. In the learn mode, wireless sensor unit 802 is configured to generate sensor data.

In response to wireless sensor unit 802 entering the learn mode, light emitting diode 810 is turned on in this depicted example to provide a visual indication that the wireless sensor unit is in learn mode.

Marker 812 includes label 814 and barcode 816. Both label 814 and barcode 816 provide an identifier for wireless sensor unit 802. Barcode 816 is a two-dimensional barcode in this illustrative example.

In this illustrative example, marker 804 is located on seat 805 near wireless sensor unit 802. Marker 804 is associated with seat 805 in this example. Marker 804 includes label 818 and barcode 820. Barcode 820 is a two-dimensional barcode in this illustrative example.

Hand tool 806 reads label 818 and/or barcode 820 for marker 804. Hand tool 806 may also read label 814 and/or barcode 816 for wireless sensor unit 802.

When wireless sensor unit 802 is switched to learn mode, wireless sensor unit 802 can receive information from hand tool 806 and/or marker 804. For example, hand tool 806 reads the identification information for marker 804 indicated by barcode 820. Hand tool 806 sends this identification information to wireless sensor unit 802 when wireless sensor unit 802 is in learn mode.

In some illustrative examples, pressing button 808 on wireless sensor unit 802 causes wireless sensor unit 802 to send a signal to marker 804. This signal causes marker 804 to send a response signal to wireless sensor unit 802 containing identification information for marker 804.

In yet other illustrative examples, hand tool 806 sends a wireless signal to wireless sensor unit 802. In response to receiving this wireless signal, wireless sensor unit 802 enters the learn mode and sends a response signal to hand tool 806.

In response to receiving the response signal from wireless sensor unit 802, hand tool 806 sends a wireless signal to marker 804. Marker 804 sends a response signal to hand tool 806 containing the identification information. In some illustrative examples, hand tool 806 may be configured to present an audio and/or visual indication to the user that the identification information has been received from marker 804.

With this type of process, hand tool 806 may serve as a form of authenticating the user. For example, access to wireless sensor unit 802 and/or marker 804 may be restricted to users with access to hand tool 806 and/or a password to activate hand tool 806.

Figure 9:
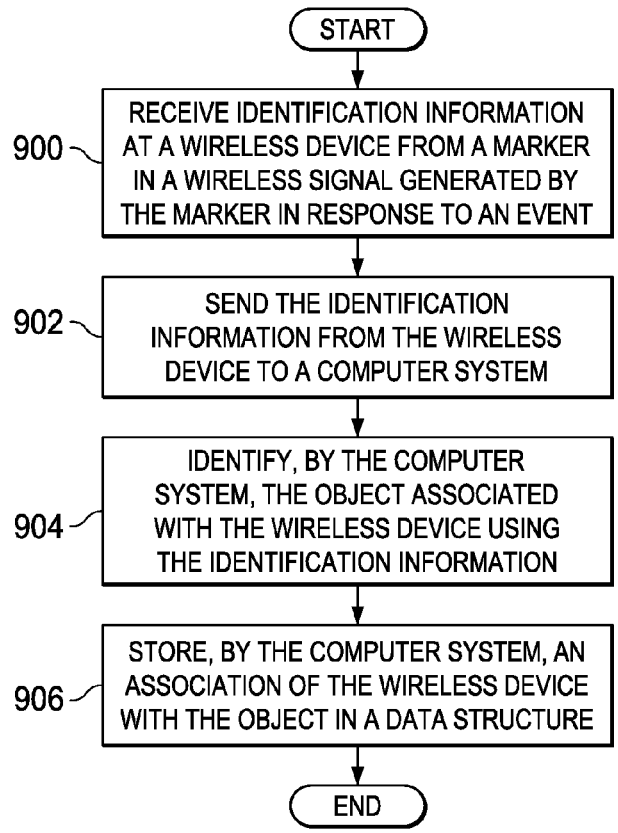
FIG. 9 is an illustration of a flowchart of a process for identifying sensor units in accordance with an advantageous embodiment.

With reference now to FIG. 9, an illustration of a flowchart of a process for identifying wireless devices is depicted in accordance with an advantageous embodiment. The process illustrated in FIG. 9 may be implemented using wireless system 302 in FIG. 3.

The process begins by a wireless device receiving identification information from a marker in a wireless signal generated by the marker in response to an event (operation 900). The marker is associated with an object. In operation 900, the event may be, for example, a period of time elapsing, the wireless device being turned on, the wireless device receiving a request for the identification information, or some other suitable type of event.

The wireless device then sends the identification information from the wireless device to a computer system (operation 902). In operation 902, the wireless device may send the identification information to the computer system along with sensor data generated by the wireless sensor unit. Further, the wireless device may send information to the computer system using a number of routers in a wireless network.

Thereafter, the computer system identifies the object associated with the wireless device using the identification information (operation 904). Operation 904 may be performed by comparing the identification information to a group of identifiers of markers assigned to objects.

The computer system then stores an association of the wireless device with the object in a data structure (operation 906), with the process terminating thereafter. In operation 906, the association may be stored in, for example, device database 350 in FIG. 3 or some other suitable data structure.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for identifying wireless devices. Identification information is received from a marker in a wireless signal generated by the marker at a wireless device. The marker is associated with an object. The identification information of the object associated with the marker is sent from the wireless device to a computer system in the sensor system. The computer system associates the wireless device using the object identifier.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft comprising a fuselage and further comprising:

an object which is part of the aircraft;
a computer system inside of and connected to the aircraft;
a marker connected to the aircraft and associated with the object, wherein the marker is configured to wirelessly transmit a first wireless signal containing identification information unique to the marker, the first wireless signal having a limited range, wherein the limited range comprises a range that reaches less than all of an area of the aircraft;
a wireless device connected to the aircraft within the limited range, the wireless device configured to receive the first wireless signal and to transmit a second wireless signal to the computer system, the second wireless signal containing at least the identification information, wherein the wireless device further comprises a sensor configured to sense parameters of the object, and wherein the wireless device is further configured to transmit sensor data that includes the parameters and the identification information; and
wherein the computer system is configured to use the identification information to associate the wireless device with the object.

2. The aircraft of claim 1, wherein the wireless device is further configured to obtain the identification information from the marker in response to an event.

3. The aircraft of claim 1, wherein the wireless device is further configured to select the identification information for the marker from other identification information received in a plurality of signals received from a plurality of other markers.

4. The aircraft of claim 3, wherein the wireless device is further configured to select the identification information for the marker from the other identification information received in the plurality of signals based on corresponding signal strengths of ones of the plurality of signals.

5. The aircraft of claim 1, wherein the identification information is first identification information; the marker is a first marker; the wireless device is further configured to obtain second identification information from a second marker associated with a second object forming part of the aircraft, and send the first identification information and the second identification information to the computer system; and the computer system is configured to associate the wireless device with both the first object and the second object using the first identification information and the second identification information.

6. The aircraft of claim 1, wherein the wireless device further comprises a wireless controller and wherein the wireless controller is configured to receive a wireless command from the computer system, and wherein, in response to the wireless command, the wireless controller controls an operation of the object.

7. A method executed with respect to an aircraft comprising a fuselage, an object forming part of the aircraft, a computer system inside of and connected to the aircraft, a marker connected to the aircraft and associated with the object, and a wireless device connected to the aircraft having a sensor configured to sense parameters of the object, the method comprising:
receiving, at the wireless device, identification information from the marker via a first wireless signal generated by the marker and that has a limited range, wherein the limited range comprises a range that reaches less than all of an area of the aircraft;
sending sensor data that includes the parameters of the object and the identification information from the wireless device to the computer system via a second wireless signal; and
automatically associating, by the computer system, the wireless device with the object using the identification information.

8. The method of claim 7, further comprising:
storing an association of the wireless device with the object in a data structure.

9. The method of claim 8, further comprising:
comparing the identification information to a group of identifiers for a plurality of markers assigned to objects that form part of the aircraft.

10. An apparatus comprising:
a plurality of objects forming the apparatus;
a computer system inside of and connected to the apparatus;
a plurality of markers connected to the apparatus, wherein ones of the plurality of markers are associated with corresponding ones of the plurality of objects, wherein each of the plurality of markers are configured to transmit corresponding marker wireless signals containing corresponding identification information unique to any given marker, the corresponding marker wireless signals having a limited range, wherein the limited range comprises a range that reaches less than all of an area of the apparatus;
a plurality of wireless devices connected to the apparatus, each of the plurality of wireless devices are within the limited range of at least one of the plurality of markers, wherein each of the plurality of wireless devices is configured to receive at least one corresponding marker wireless signal of at least one marker of the plurality of markers, wherein each of the plurality of wireless devices is further configured to transmit corresponding wireless signals containing the corresponding identification information to the computer system, and wherein a first set of the plurality of wireless devices comprise a plurality of sensors configured to sense parameters with respect to corresponding ones of the plurality of objects and wherein a second set of the plurality of wireless devices comprises a plurality of controllers configured to control corresponding operations of the plurality of objects, wherein at least one of the plurality of wireless devices both senses a parameter with respect to its corresponding object and controls an operation of its corresponding object; and
wherein the computer system is configured to receive all of the corresponding wireless signals, and associate each of the wireless devices to at least one of the plurality of objects based on the corresponding identification information.

11. The apparatus of claim 10, wherein the plurality of wireless devices further comprise a plurality of controllers configured to control corresponding operations of the plurality of objects.

12. The apparatus of claim 10, wherein the apparatus is selected from the group consisting of: an aircraft, a spacecraft, a tank, a submarine, a surface ship, a train, an office building, a manufacturing facility, and a bridge.

* * * * *